Nov. 13, 1951     H. J. SCHELL     2,575,188
RACK FOR HOLDING ROASTS
Filed June 6, 1947
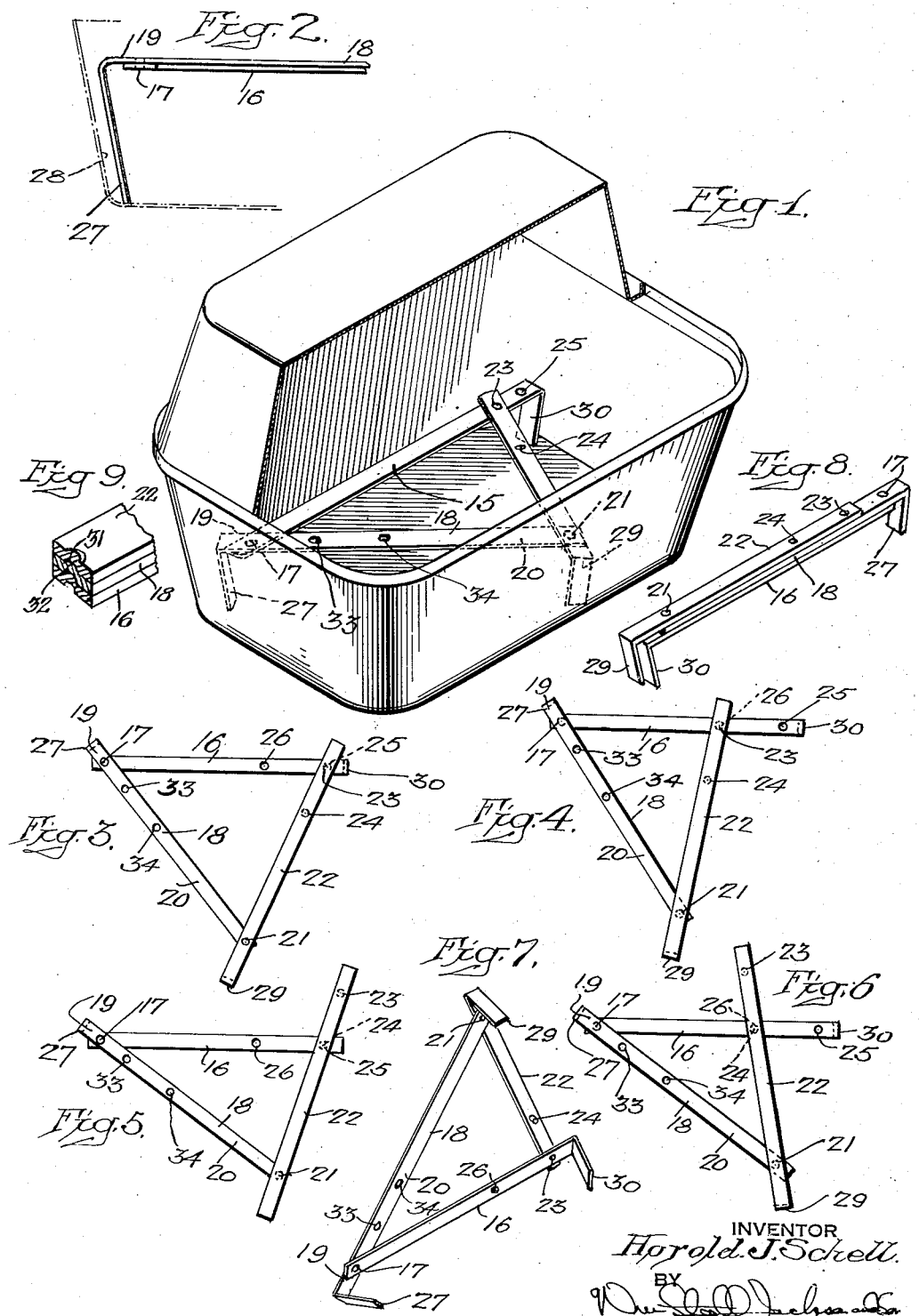
INVENTOR
Harold J. Schell.
BY
ATTORNEYS Patented Nov. 13, 1951

2,575,188

UNITED STATES PATENT OFFICE 2,575,188

RACK FOR HOLDING ROASTS

Harold J. Schell, Philadelphia, Pa.

Application June 6, 1947, Serial No. 752,939

1 Claim. (Cl. 99—449)

My invention relates to an adjustable stand for supporting meat, etc., with a roasting pan, or for similar uses.

The main purpose of my invention is to provide an adjustable supporting device within a roasting pan to support the meat above the fat in the bottom of a pan.

A further purpose is to provide an adjustable three-legged supporting device for supporting meat or the like while it is being roasted.

A further purpose is to provide a triangular supporting device for meat or the like which can have multiple adjustments for pans of different sizes.

A further purpose is to provide leg supports for a stand which are bent inwardly with respect to vertical.

A further purpose is to use an adjustable support for meat or the like which can be changed from one position of use to another position of use according to the size of the pan where the cooking takes place, and which is also capable of being folded and locked in a compact storage position.

A further purpose is to support a roast or the like for cooking in such a way as to permit more uniform exposure to the cooking heat, and prevent the necessity of turning the roast.

Further purposes will appear in the specification and in the claim.

In roasting meat or the like in a pan, I have found it desirable to have the object to be cooked placed somewhat above the bottom of the pan.

When the roast is placed above the bottom of the pan, the heat supplied circulates more freely about the roast to provide more even distribution of heat, thereby providing better cooking without danger of burning or over-roasting the meat, as when it is placed on the bottom of the pan. I have also found it desirable to place the meat above the bottom of the pan in order to keep the fat or grease which drips from the meat to the bottom of the pan away from the object being roasted. This prevents the roast from becoming too greasy from fat being absorbed by the meat.

I have also found it desirable to provide a support for a roast, which support can be used in roasting pans of different sizes by adjustment of the support, and which is triangular with an open center, to permit the joint to hang below the level of the top of the rack.

I have also found it desirable to provide a support of the character above described which can be folded into a compact storage position.

Referring to the drawings:

Figure 1 is a perspective view of a roasting pan with the cover broken away and with my improved support in place within the pan.

Figure 2 is a fragmentary side elevation of my support showing one of the legs of the support in a position within a roasting pan and in contact with the bottom of the pan, the pan being shown in dot-and-dash lines.

Figure 3 is a top plan view of my support with the arms thereof in fully extended position.

Figure 4 is a view similar to Figure 3, but with the arms in a contracted position.

Figure 5 is a view similar to Figures 3 and 4 with the arms in a different contracted position.

Figure 6 is a view similar to Figures 3, 4 and 5 but with the arms in a further contracted position.

Figure 7 is a perspective view showing my support in any adjusted position similar to that of Figure 3, but viewed from a different angle.

Figure 8 is a perspective view of my support in a folded compact position for storage.

Figure 9 is a fragmentary sectional perspective illustrating a modification.

My support 15 comprises a flat bar 16, pivoted at 17 to an angularly disposed bar 18 intermediate the end 19 and the forward length 20 of the bar 18. The extreme forward end of the bar 18 is pivoted at 21 to another angularly disposed bar 22. The bar 18 to which is pivoted bars 16 and 22 carries and supports the bar 16, and is supported by the bar 22, but due to the pivots at 17 and 21, these bars are capable of swinging movement to allow pins 23 and 24 projecting outwardly therefrom to engage in apertures 25 or 26 in the bar 16.

The bar 22 can be lifted slightly to disengage either one of the pins 23 or 24 from the openings 25 or 26. If it is desired to change the overall size of the stand to permit the device to be placed in a different sized container from that shown in Figure 1, or to grip a different size of roast, or to permit a different shape of joint to occupy the triangular central portion, the bar 22 can be moved from the position shown in Figure 3 to the position shown in Figure 4, in which the pin 23 on the bar 22 is moved laterally and inserted into the opening 26. At the same time the bar 18 will assume a slightly different angular position, swinging from that shown in Figure 3 to that shown in Figure 4.

The bar 18 has a downwardly angularly disposed leg 27 which may bend to conform to the angle of the pan side 28, as clearly shown in Figure 2.

The bar 22 is provided with a leg 29 and the bar 16 is provided with a leg 30. All three of the legs are of the same length to rest on the bottom of the pan and to bring the supporting bars to register at approximately the same height from the bottom of the pan and all three legs are also bent inwardly to conform approximately to the angular shape of the sides of the pan.

In Figure 5 the bar 18 is swung closer to the bar 16 because the bar 22 has had its pin 24 brought into the aperture 25 in the bar 16. In this position the stand can be placed in a different sized container, or can support a different shape object.

In Figure 6, I have shown another possible position of the stand in which the bar 16, as shown in the drawing, still retains its relatively horizontal position. The bar 18 is in a position somewhat similar to Figure 5, but the bar 22 has been swung on its pivot 21 to some such position that the pin 24 will engage in the opening 26 in in the bar 16.

It wil be clearly seen that by pivoting the bars with other bars as described, and with the possibility of registering the pins 23 or 24 carried by the bar 22 into either opening 25 or 26, a number of desirable sizes of the stand or support for the roast can be obtained for use with different sizes of food to be cooked.

In Figure 7, I have shown a perspective view taken from an angle different from that shown in Figure 1, in which the pins are shown with which the change of position of the bars can be easily obtained, and at the same time the legs of the bars are more clearly illustrated.

In Figure 8 I have shown the stand in a folded or collapsed position to make the device suitable for storage.

In operation the arms of the stand are moved to a position to adapt the stand to the proper size for the pan in which it is desired to perform the roasting operation. After the stand is placed in the roasting pan, the roast is placed upon the stand in such a position that it will be above the bottom of the pan and free from whatever fat or grease which may accumulate therein when the roasting takes place, and at the same time the heat will circulate freely about the object being roasted so that the roast will not be in danger of being burned on account of the close contact with the bottom of the pan and will be away from the fat or grease in the pan.

It will be evident that the bar 22 is free to lift slightly due to the looseness in the pivot, or by slightly bending the bar, to allow for slight dislodgment of the pin from apertures in the opposite bar.

While I have shown the pins 23 and 24 as being in the formation of rivets will be understood that projections may be punched from the bars for making engagement in the apertures of other bars.

In Figure 9 I have also illustrated a modification showing projections 31 and recesses 32 punched from the bars which may act as detents to hold the bars in a folded or collapsed position.

In Figure 8, pins 23 and 24 fit into holes 33 and 34 in bar 18 to lock the bars in closed position.

It will be evident that by using the three legs on the stand or support, the adjustment of the bars with the structure adapts itself to the irregularity of different pan formations.

It will also be evident that the triangular shape of the stand when it is placed in the pan adapts itself to great advantage in cooking fowl, as the breast will fit compactly in the triangle formed.

While I have shown the unit in Figure 8 as in a compact or folded position, it will be understood that when it is desired to wash or clean the stand, this can readily be acomplished by opening the stand into one or more of its triangular shaped positions to facilitate cleaning, before it is stored away.

It will be obvious that the rivets may be of eyelet type as well as those shown.

It will be evident that by the present invention the roast, fowl or other meat or poultry undergoing cooking is exposed very completely to the heat of the oven, so that it can be cooked without burning, while voiding the necessity of turning the meat.

In vew of my invention and disclosure variations and modifications to met individual whim or particular need will doubtless become evident to others skilled in the art, to obtain all or part of the benefits of my invention without copying the structure shown, and I, therefore, claim all such insofar as they fall within the reasonable spirit and scope of my claim.

Having thus described my invention what I claim as new and desire to secure by Letters Patent is:

In an adjustable roasting stand, three side bars forming a triangle in extended position of the stand, each having a leg portion extending downwardly at one end of each bar, permanent pivotal interconnection between one end of each of two of the bars and opposite ends of the third bar and readily detachable pin and socket connection between the ends of the first and second bars remote from the permanent pivotal connections, selectively interconnecting the first and second bars at different positions, the first and second bars all folding on the third bar in overlapping relation, and pin and socket connections interconnecting the bars in folded position.

HAROLD J. SCHELL.

REFERENCES CITED

The following references are of record in the file of this patent:

UNITED STATES PATENTS

| Number | Name | Date |
| --- | --- | --- |
| 452,521 | Hartman | May 19, 1891 |
| 1,148,129 | Taylor | July 27, 1915 |
| 1,266,244 | Fortmann | May 14, 1918 |
| 1,271,326 | Kivlan | July 2, 1918 |
| 2,101,474 | Minters | Dec. 7, 1937 |

FOREIGN PATENTS

| Number | Country | Date |
| --- | --- | --- |
| 171,230 | Great Britain | Nov. 17, 1921 |
| 210,255 | Germany | May 27, 1909 |
| 323,573 | France | June 25, 1902 |
| 596,846 | Germany | May 16, 1934 |